US006800351B1

(12) United States Patent
Pflug et al.

(10) Patent No.: US 6,800,351 B1
(45) Date of Patent: Oct. 5, 2004

(54) FOLDED HONEYCOMB STRUCTURE CONSISTING OF CORRUGATED PAPERBOARD AND METHOD AND DEVICE FOR PRODUCING THE SAME

(75) Inventors: Jochen Pflug, Wiesbaden (DE); Ignace Verpoest, Kessel-Lon (BE)

(73) Assignee: K.U. Leuven Research & Development, Leuven (BE)

(*) Notice: Subject to any disclaimer, the term of this patent is extended or adjusted under 35 U.S.C. 154(b) by 0 days.

(21) Appl. No.: 09/937,635

(22) PCT Filed: Mar. 25, 2000

(86) PCT No.: PCT/EP00/02646

§ 371 (c)(1), (2), (4) Date: Jan. 23, 2002

(87) PCT Pub. No.: WO00/58080

PCT Pub. Date: Oct. 5, 2000

(30) Foreign Application Priority Data

Mar. 26, 1999 (DE) ........................................ 199 13 830

(51) Int. Cl.$^{7}$ .................................................. B32B 3/00

(52) U.S. Cl. ......................... 428/73; 428/116; 428/166; 428/167; 428/188; 428/189; 428/190; 156/65; 156/166; 156/176; 156/182; 156/196; 156/198; 156/204; 156/205; 156/207; 156/210; 156/211; 156/227; 156/250; 156/268; 83/51; 83/52

(58) Field of Search ............................ 428/72, 73, 116, 428/117, 118, 166, 167, 188, 189, 190; 156/60, 65, 166, 176, 182, 196, 198, 204, 205, 207, 210, 211, 227, 250, 268; 83/51, 52

(56) References Cited

U.S. PATENT DOCUMENTS 4,948,445 A 8/1990 Hees
5,132,156 A * 7/1992 Trassare, Jr. et al.

OTHER PUBLICATIONS

International Fibreboard Case Code, International Corrugated Case Association, 1990.

* cited by examiner

*Primary Examiner*—Deborah Jones
*Assistant Examiner*—Wendy Boss
(74) *Attorney, Agent, or Firm*—Barnes & Thornburg LLP

(57) ABSTRACT

The invention relates to a folded honeycomb structure and to a method and device for producing said folded honeycomb structure from a corrugated core web. The folded honeycomb structure has a number of adjacent corrugated core strips which lie in one plane and are interconnected by cover layer strips. Said cover layer strips are folded about 180° and are perpendicular to said plane. According to the inventive method for producing the folded honeycomb structure, interconnected corrugated core strips are produced first by making a number of longitudinal scores in a corrugated core web. These corrugated core strips are then alternately rotated through 90° respectively so that the cover layer strips fold and the folded honeycomb structure is formed. The device corresponding to this method consists of a number of rotating blades for making the longitudinal scores and a number of guiding elements for rotating the interconnecting corrugated core strips.

24 Claims, 7 Drawing Sheets

Figure 1:
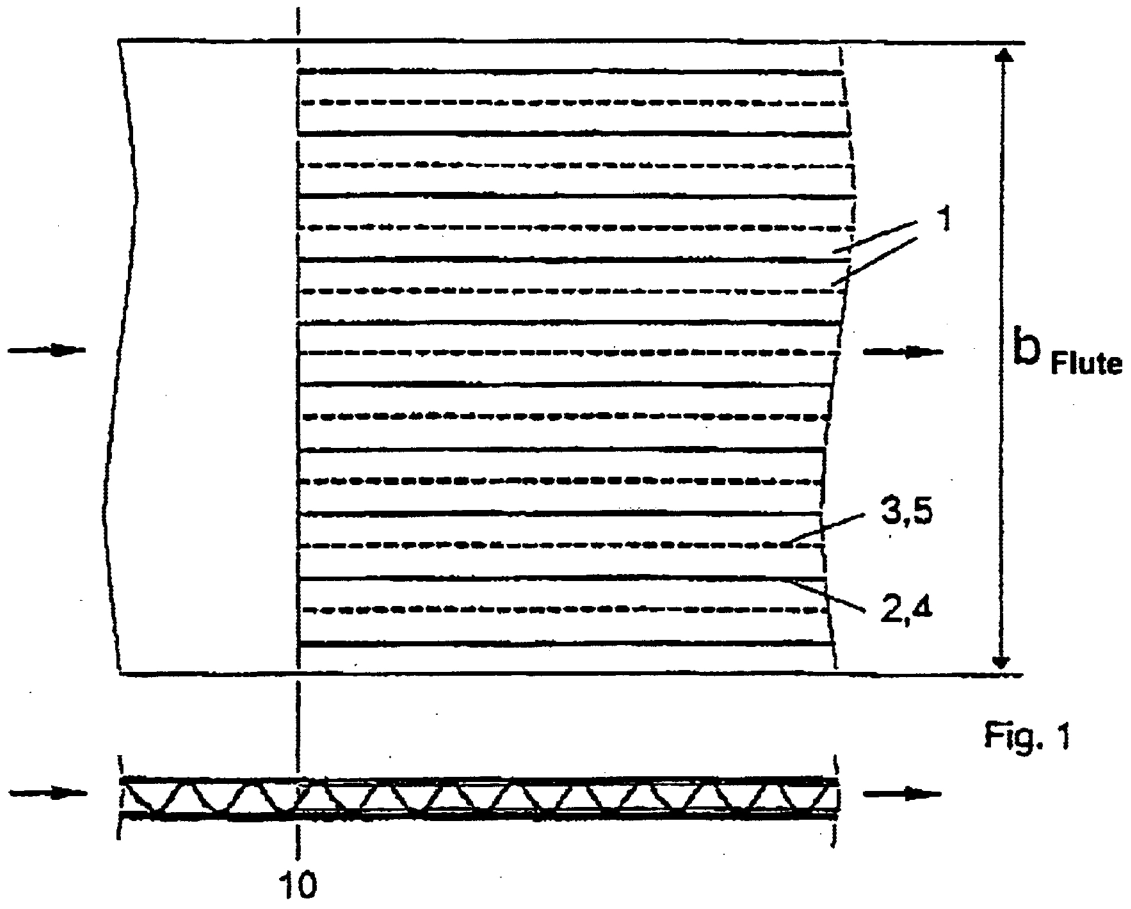

FOLDED HONEYCOMB STRUCTURE CONSISTING OF CORRUGATED PAPERBOARD AND METHOD AND DEVICE FOR PRODUCING THE SAME

The invention relates to honeycomb core layers such as are used in sandwich materials for packaging and structural applications, as well as to processes and apparatus for producing these honeycomb cores.

In the aerospace industry, honeycomb cores have preferably been used for many decades as core material for sandwich panels and boards that are resistant to buckling and bending. These honeycomb cores, which are mostly hexagonal or over-expanded, consist predominantly of aluminum or phenolic-resin impregnated aramide fiber paper and are usually produced in the expansion process. A sandwich structure having two, usually adhesively bonded cover layers provides extremely high stiffness/weight and strength/weight ratios. The interest expressed by other large branches of industry in lightweight sandwich core materials with good weight-specific material characteristics is continually growing, so that in the meantime more than half the honeycomb core materials are being used in other sectors.

The use of honeycombs for packaging, in automobile and comparable markets requires fast and continuous production of the honeycomb core layer, in order that a product which is competitive with corrugated board and other inexpensive materials can be produced.

A sandwich with a honeycomb core has high specific compressive strengths in the material plane, because of the optimum, virtually orientation independent, support of the covering layers. As compared with a sandwich with a corrugated core (for example corrugated cardboard), better edge compression resistances and flexural rigidity values can be achieved, in particular in the machine direction. As a result, significant savings in weight and material are possible. The pressure characteristics are also considerably better at right angles to the plane of the material because of the perpendicular, mutually supporting cell walls. In addition, a sandwich with a honeycomb core has a better surface quality, which is important in particular for printing packaging materials. Because of these advantages and the increase in demand for inexpensive sandwich cores, numerous efforts have been taken in the past to reduce the high production costs of honeycomb cores.

Many processes are known in which individual material strips or a continuous material web is adhesively bonded at alternating locations and then expanded (U.S. Pat. No. 4,500,380 Bova, DE 196 09 309 Hering, U.S. Pat. No. 4,992,132 Schmidlin, U.S. Pat. No. 5,334,276 Meier). Such processes are already used for the partially automated production of paper honeycombs with cell sizes above about 10 mm for internal packaging, edge and corner elements and also for pallets. The necessary forces and the material stresses during expansion place high requirements on the adhesive and the adhesive bonding of the cell walls. By means of pre-embossing the fold lines, these forces can certainly be reduced but the regularity of the honeycomb geometry suffers from the expansion process, in particular in the case of paper honeycombs with small cell sizes. The internal stresses and the necessary expansion forces are increased considerably in the case of smaller cell sizes. For this reason, these processes are increasingly problematic for smaller cell sizes and more difficult to automate. In addition, the production speed is limited by the required cross-cutting of the web.

Likewise, many processes are known in which individual, corrugated or trapezoidal material webs or strips are adhesively bonded in an offset manner (U.S. Pat. No. 3,887,418 Jurisisch, U.S. Pat. No. 5,217,556 Fell, U.S. Pat. No. 5,399,221 Casella, U.S. Pat. No. 5,324,465 Duffy). Technical implementation to obtain a continuous process with a high production speed is difficult in the case of these processes, because of the necessary positioning and handling of the individual material webs.

Furthermore, processes are known in which corrugated cardboard is processed to form honeycomb cores. In one process, corrugated cardboard is used in the cell walls of honeycomb cores (U.S. Pat. No. 4,948,445 Hess). In this case, individual sheets of corrugated cardboard with flutes running in the production direction are supplied and short cross-cuts going through the entire thickness of the corrugated cardboard are introduced. Therefore, following folding in the production direction and expansion, corrugated cores with relatively large cell sizes and relatively thick cell walls are produced. The process is principally the same as the expansion process with a continuous material web.

Furthermore, honeycombs and processes are known in which a corrugated cardboard web (U.S. Pat. No. 3,912,573 Kunz) or an individual corrugated web (WO 91/00803 Kunz) with the flutes transverse to the production direction is cut into strips. After the web has been cut up, a honeycomb core layer is then produced by bonding the individual strips adhesively to one another. This process requires a certain size of the individual strips or special positioning tapes, in order that their handling is still ensured. Because of the size of the strips, the web width is reduced considerably following the rotation of the strips. In order not to obtain too small a width of the honeycomb core layer, the strips are cut off in a further production step and adhesively bonded to form a honeycomb block, which is then conveyed considerably more slowly transversely to the production direction. For small honeycomb heights, this honeycomb block has to be cut up, if appropriate. The honeycombs produced by such a process also have individual straight strips between individual corrugated or trapezoidally shaped cell wall strips. Such reinforced honeycombs are also known from manual production via a block (WO 95/10412 Darfler). There, the individual flat layers are placed between the individual corrugated layers and adhesively bonded to them.

Honeycombs and processes for their production are also known in which a continuous material web, following the introduction of cuts, is initially corrugated or formed trapezoidally before the connected cell walls are folded against one another and adhesively bonded (WO 97/03816 Pflug). In order to achieve a saving in material in packaging applications, in particular as compared with corrugated cardboard, a very lightweight paper (40 g/m$^2$ to 80 g/m$^2$) is to be preferred. When corrugating these low grammages, it is advantageous to stabilize the flute immediately after it has been formed by bonding it onto a web. In particular, in the case of corrugation transversely to the production direction, as is common in the production of corrugated cardboard at speeds up to 350 m/min, a covering layer (a liner, as it is known) has to be bonded on immediately. The corrugated web on its own cannot absorb the tensile stress necessary for the rapid conveyance of the material web.

Furthermore, processes and apparatus are known for introducing slits into corrugated cardboards (U.S. Pat. No. 5,690,601 Cummings). These slits are made along the flutes of individual sheets of corrugated cardboard (in the transverse direction to the actual production direction of the corrugated cardboard) in order to permit a defined folding. In this process, folding is carried out towards the cut so that the latter is closed.

The invention is based on the object of specifying a honeycomb core layer, a process and an apparatus which permit the continuous production of honeycombs with relatively small cell sizes at a production speed comparable with the production of corrugated cardboard. In addition, good surface quality as well as reliable and quick attachment of the covering layers is desired.

The object set is achieved on the basis of the measures of claims 1, 7 and 14 and with the aid of the intermediate product as claimed in claim 23, and developed further by further features of the subclaims.

In the invention, a corrugated or trapezoidal material web having at least one, but preferably having two, covering layers is supplied. This can be corrugated cardboard or else a plastic fibre composite or metal corrugated core board. In addition, a web having a plurality of corrugated cores, for example a double-flute corrugated cardboard (BC flute, AA flute) can be used. The cover layers preferably also consist of very thin material (weight per unit area between 60 $g/m^2$ and 100 $g/m^2$) and the corrugated core layer consists of material up to twice the thickness since the covering layers in the preferred variant of the folded honeycomb are laid doubled. In this case, very low demands are placed on the quality of the cover layers, and also on the thickness tolerance and surface quality of the corrugated core web, since these factors have little influence on the surface quality of the end product.

The thickness of the corrugated cardboard web determines the size of the honeycomb cells. In order to support the cover layers, cell sizes of 4.7 mm (A flute) or, at very low weights per unit area, 3.6 mm (C flute) are adequate since the flat corrugated core cover layer strips provide an additional support and reduce the risk of dimpling of the cover layers in the cells. However, corrugated cores with smaller and larger cell sizes can also be produced from corrugated core webs with smaller and larger heights of the flute (e.g. K flute).

According to one embodiment of the invention, the multi-layer web is firstly provided in the conveying direction with a large number of continuous fold lines on the underside and the upper side. The fold lines can be introduced, for example, by means of pressing or longitudinal cutting of the web. The cuts do not quite cut through the web in the thickness direction but in each case leave a continuous cover layer (or the cover layer and the peaks of the flutes). The cuts on the upper side are in this case located as accurately as possible halfway between the cuts on the underside. The irregularities in the cover layers, which are normal in corrugated cardboard, and the different cutting forces between the peaks of the flutes can lead to the cover layer being partly or wholly cut through at individual points. This is entirely desirable, provided that the corrugated core strips still remain connected in the transverse direction. The necessary folding force can be reduced by this slight cutting or perforation of the cover layers or an additional pre-embossing of the fold lines. The corrugated core strips can also first be completely cut through and, at the same time or immediately thereafter, adhesively bonded together by means of adhesive foils. This material may be easier to bend and to fold, as compared with the material of the web. Therefore, the combination of words "formed in one piece" not only includes corrugated strips which are connected to one another by a cover layer, but also separate corrugated strips which are connected to one another by adhesive foil. The ratio between the width and the height of the connected corrugated core strips is preferably in the range from 0.5 to 2.0.

The connected corrugated core strips are then in each case rotated through 90° in such a way that the cuts open and the connected cover layers of adjacent strips are folded through 180°. Since the strips are connected, no alignment in the thickness or longitudinal direction is necessary. The strips lie planar next to each other with the connected cover layers and form the folded honeycomb. They can be adhesively bonded, joined in any other way or joined by the new cover layers only when the latter are bonded on. The application of the adhesive can then be carried out by means of rollers, nozzles or brushes, an application which constantly applies a relatively low amount of adhesive being preferred. When use is made of a corrugated core web having two cover layers, the corrugated core strips are significantly more stable than only with one cover layer, and can be adhesively bonded with some pressure. Possible deformations of the corrugated core, which often impair the surface quality in the production of corrugated cardboards, takes place here in the width direction and has no influence on the surface quality and thickness tolerance of the folded honeycomb.

The flat corrugated core cover layer strips, which are vertical in the honeycomb, are able to accommodate the tensile stresses in the production direction and permit a fast transport of the material web. They subsequently increase the shear and compression characteristics of the honeycomb, so that all the material of the corrugated cardboard is utilized in the honeycomb core folded from it.

In order to produce a honeycomb board material, new covering layers can be adhesively bonded continuously onto the honeycomb core layer immediately after the honeycomb production. In this case, the high compressive strength of the honeycomb is very useful. Good attachment of the cover layers to the honeycomb can be achieved by slight defibering of the edges during the introduction of the longitudinal cuts. In addition to the edges of the corrugated core layer, the small side faces of the folded corrugated core cover layer strips are additionally available for the attachment of the cover layers.

Figure 2:
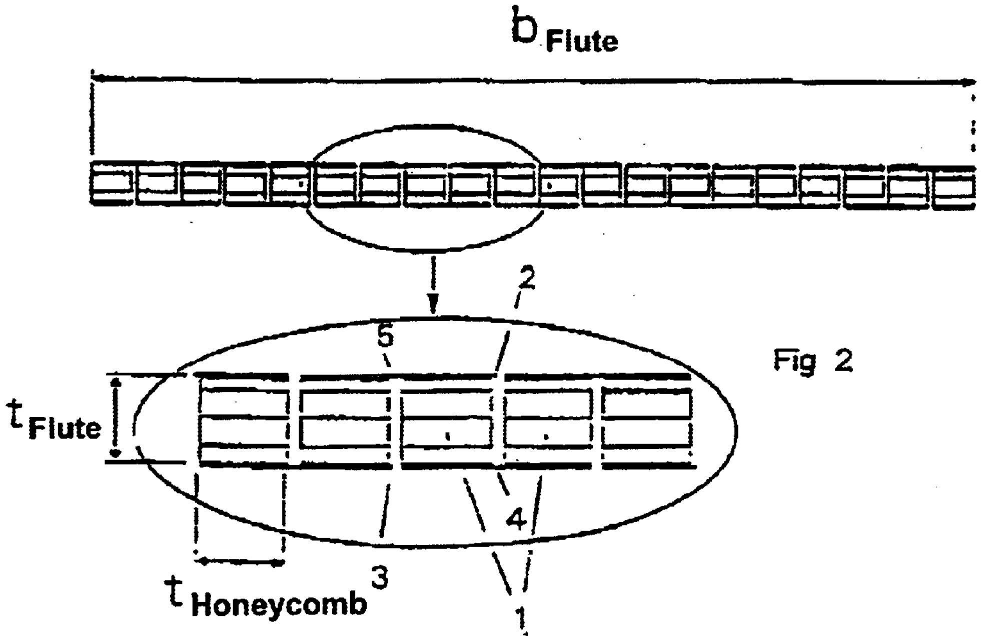
Figure 3:
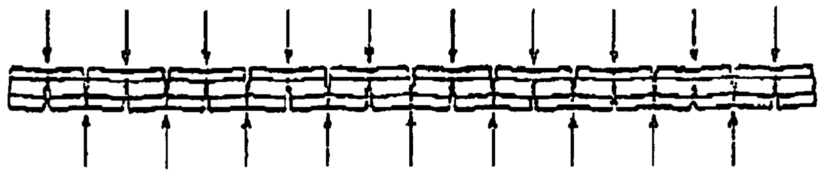
Figure 4:
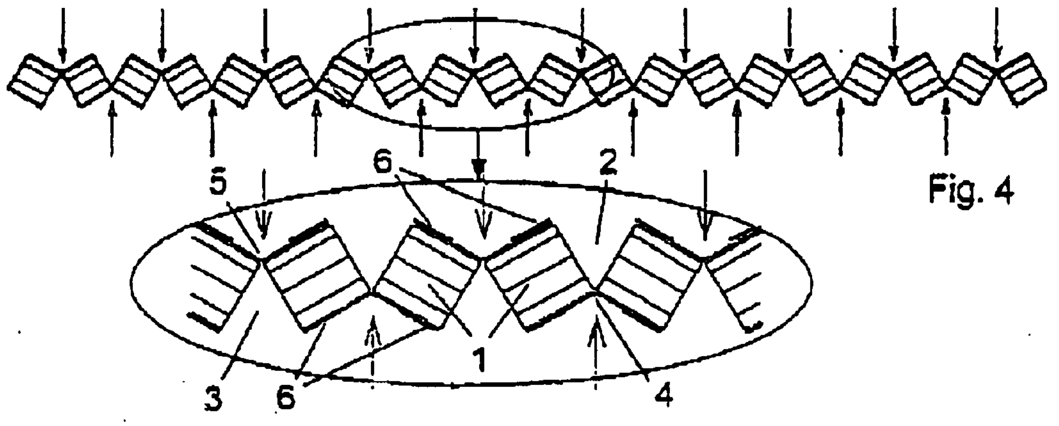
Figure 5:
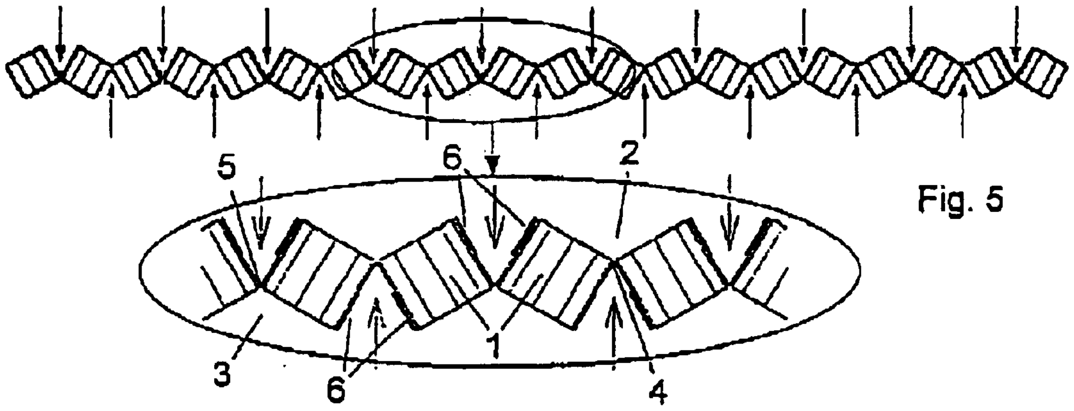
Figure 6:
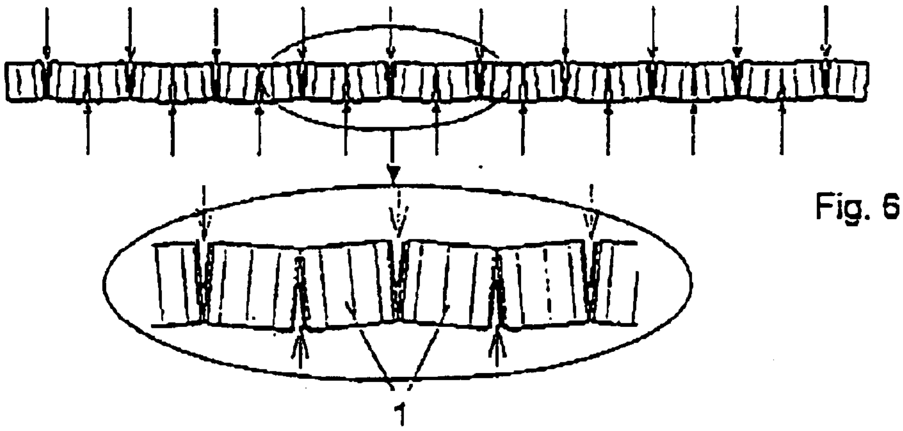
Figure 7:
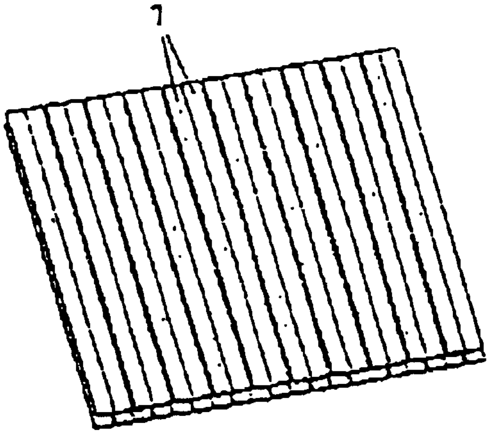
Figure 8:
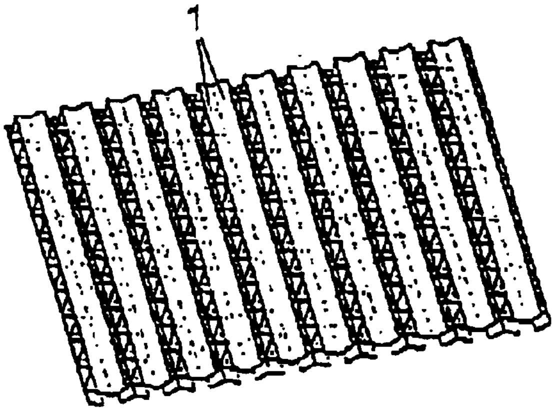
Figure 9:
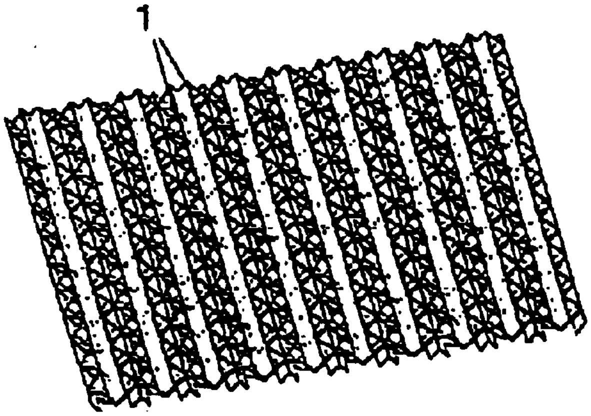
Figure 10:
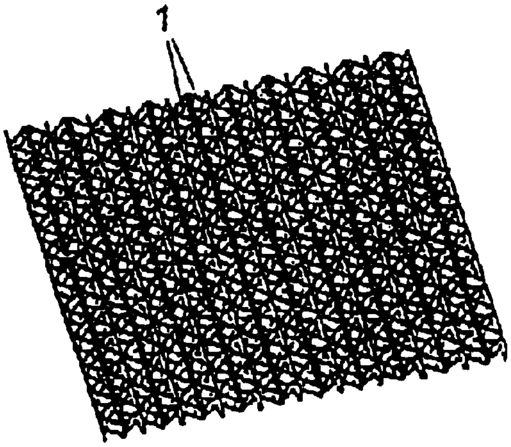
Figure 11:
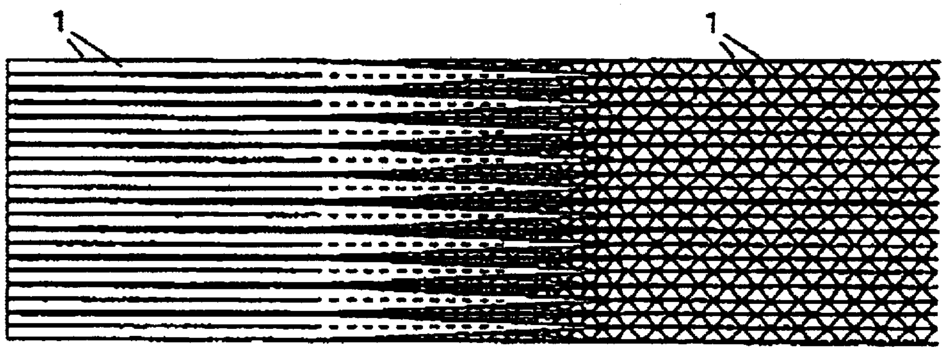
Figure 12:
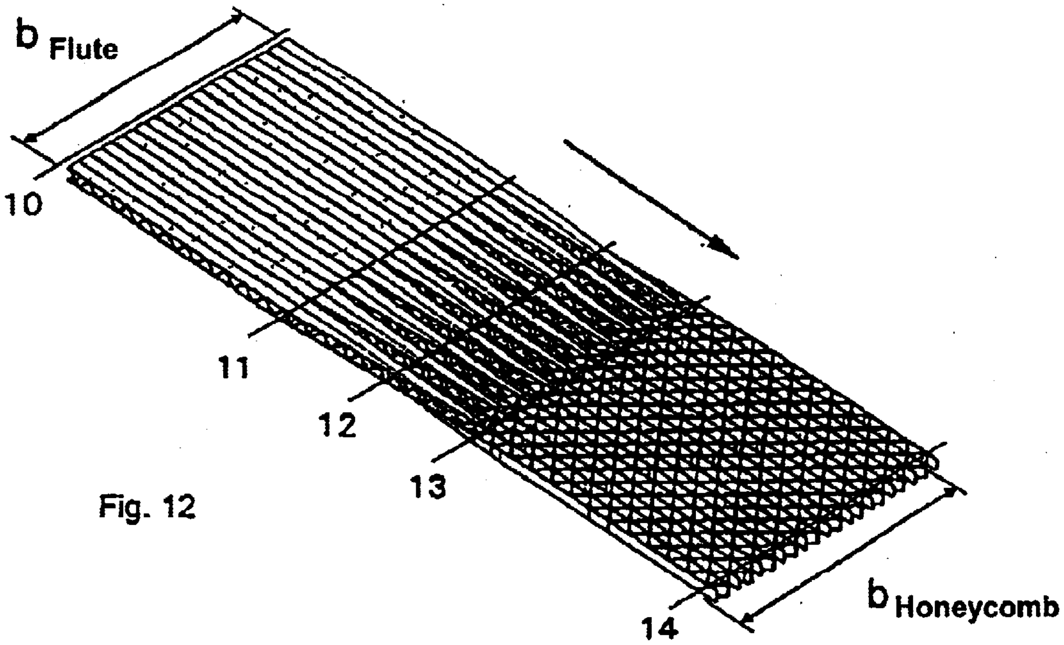
Figure 13:
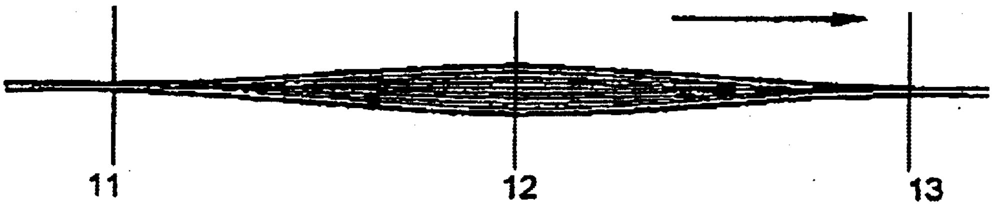
Figure 14:
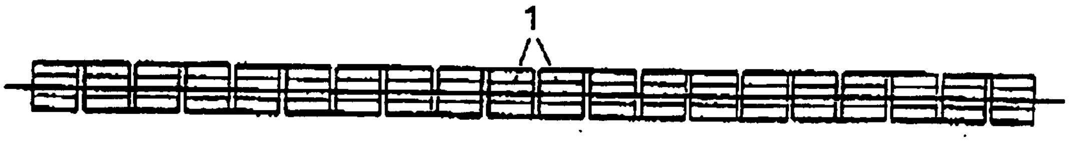
Figure 15:
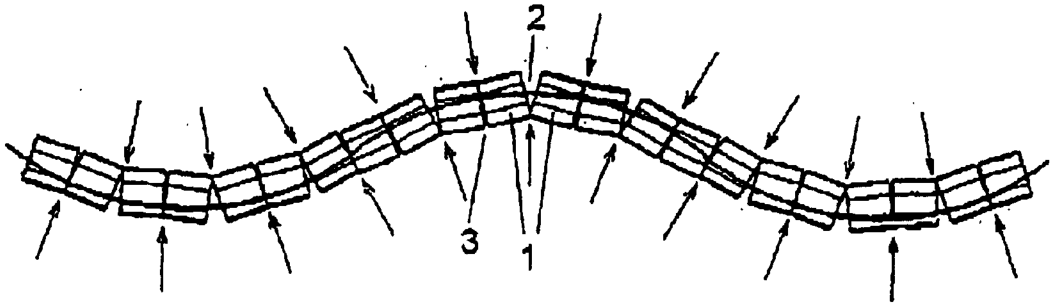
Figure 16:
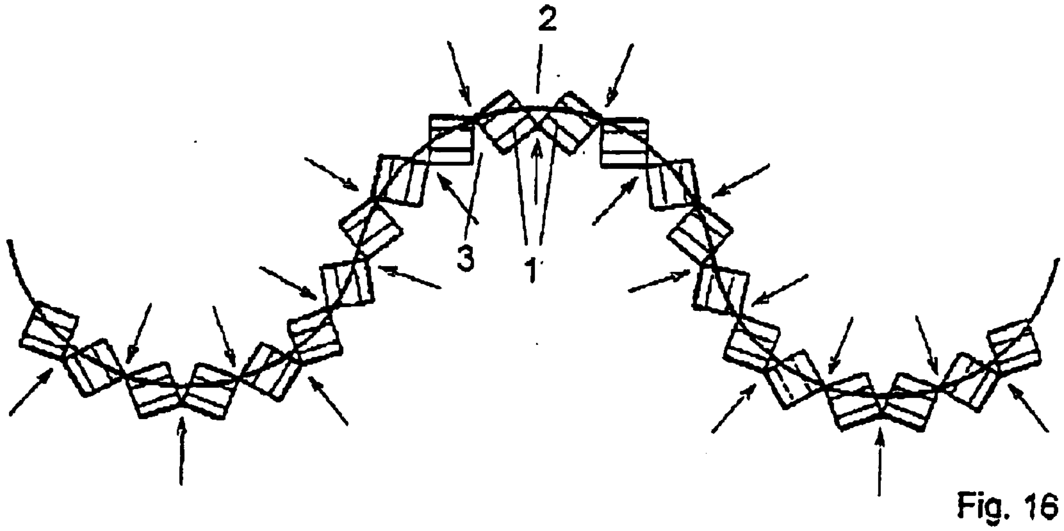
Figure 17:
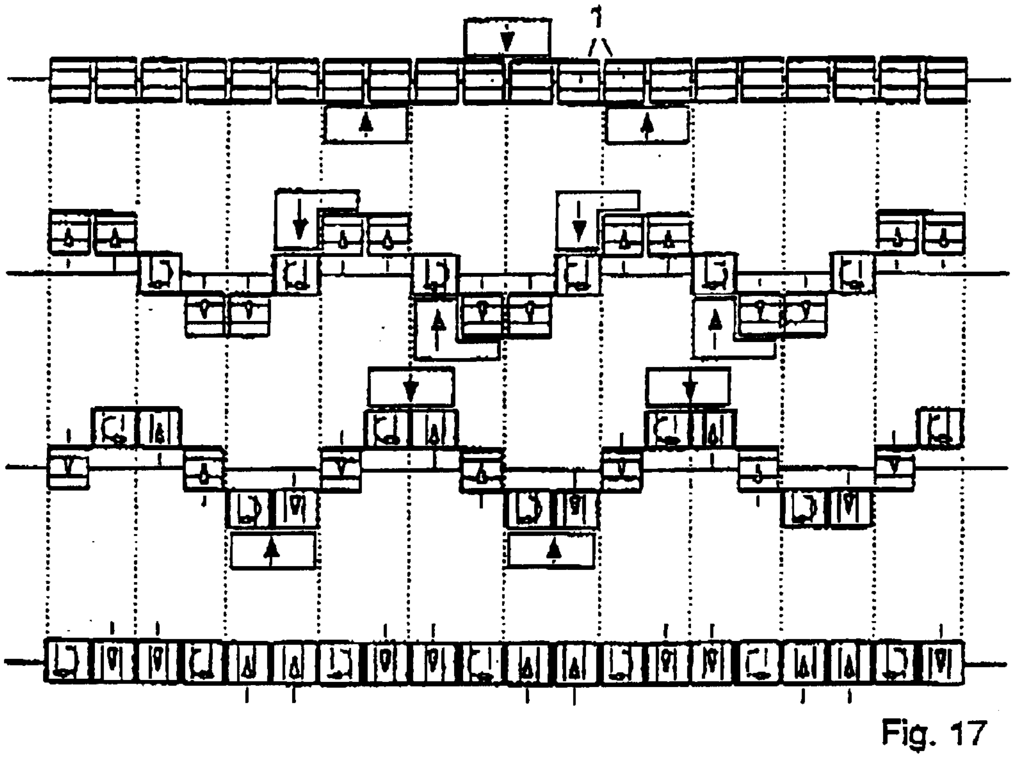
Figure 18:
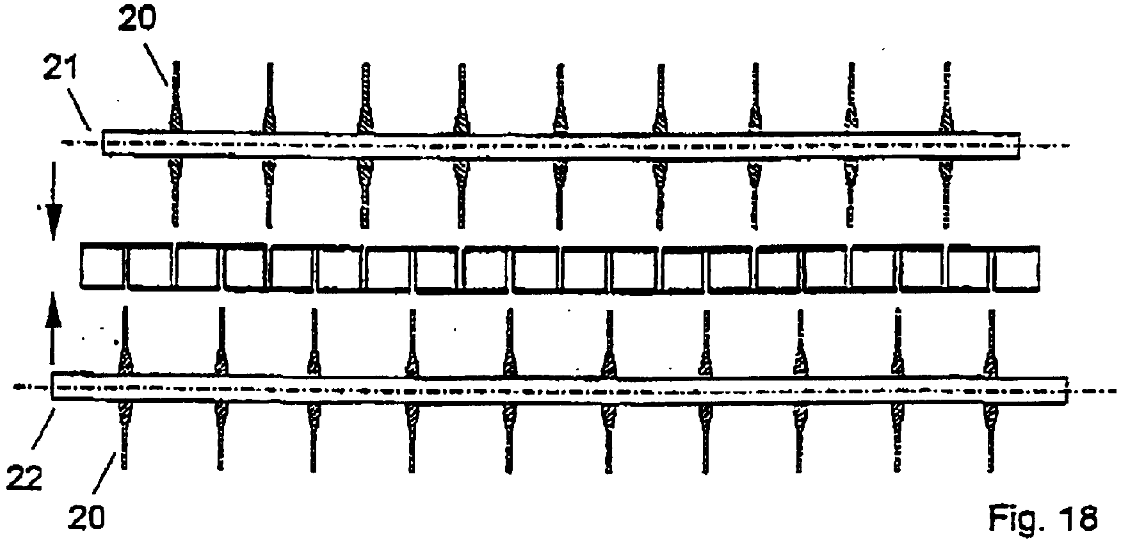
Figure 20:
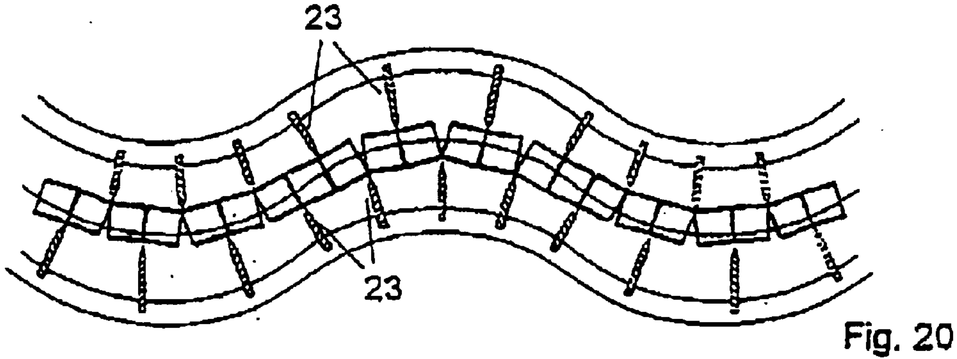
Figure 19:
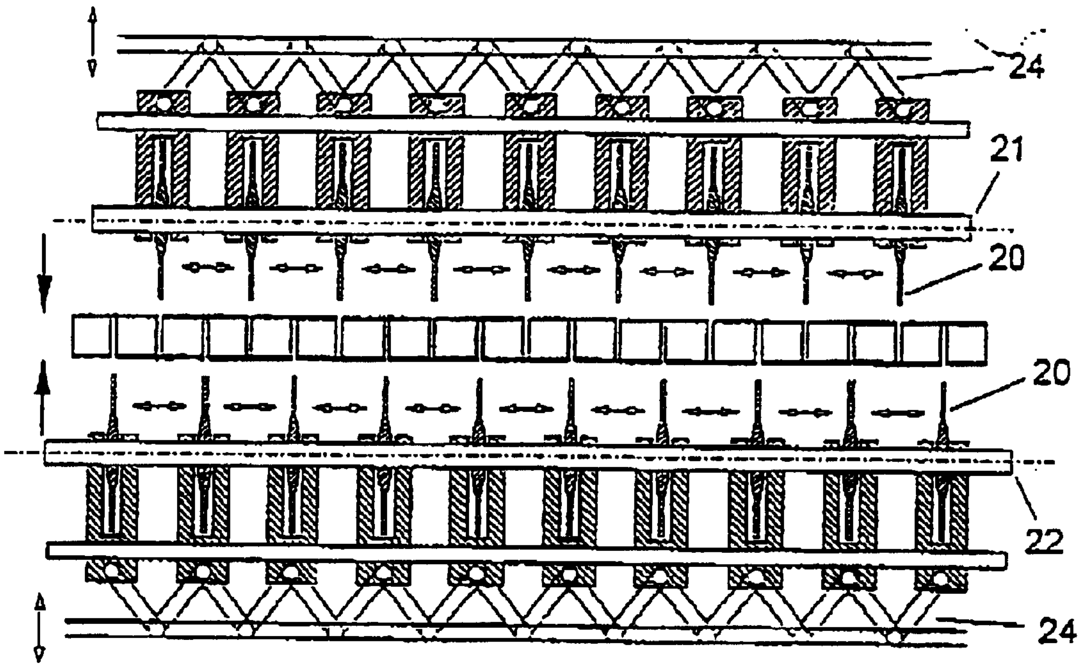
Figure 21:
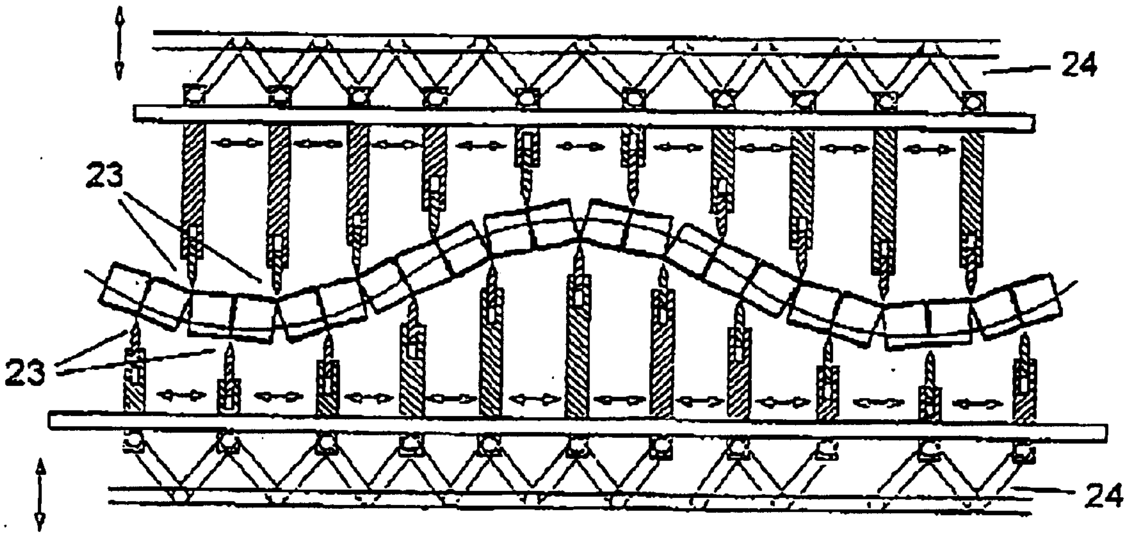

An embodiment of the honeycomb core layer, the process and the apparatus is described by using the drawings, in which FIG. 1 shows the corrugated core web and the position of the longitudinal slits in plan view and side view, FIG. 2 shows the position of the longitudinal slits in the corrugated core web in front view, FIG. 3 shows the slightly folded coherent corrugated core strips, FIG. 4 shows the connected corrugated core strips folded through 30°, FIG. 5 shows the connected corrugated core strips folded through 60°, FIG. 6 shows the almost completely folded coherent corrugated core strips, FIG. 7 shows a perspective illustration of the slightly folded corrugated core web, FIG. 8 shows a perspective illustration of the corrugated core web folded through 30°, FIG. 9 shows a perspective illustration of the corrugated core web folded through 60°, FIG. 10 shows a perspective illustration of the almost completely folded honeycomb of corrugated cardboard, FIG. 11 shows the process for producing the folded honeycomb from corrugated cardboard in plan view, FIG. 12 shows a perspective illustration of the process for producing the folded honeycomb from corrugated cardboard, FIG. 13 shows the leading of the material web out of the plane of the web in side view, FIG. 14 shows the still flat corrugated core web in front view, FIG. 15 shows the deformation out of the plane of the web in a corrugated core web folded through 5°, FIG. 16 shows the deformation out of the plane of the web in a corrugated core web folded through 45°, FIG. 17 shows the deformation out of the plane of the web in the case of three-stage rotation of each third corrugated core strip, FIG. 18 shows the apparatus for introducing the longitudinal slits for producing the folded honeycomb in front view, FIG. 19 shows the apparatus for the variable introduction of the longitudinal slits in front view, FIG. 20 shows a section of the apparatus for rotating and folding together the connected corrugated core strips to produce the folded honeycomb from corrugated cardboard, FIG. 21 shows a section of the apparatus for the variable rotation and folding together of the connected corrugated core strips.

FIG. 1 shows the supplied corrugated core web with the flutes transverse to the production direction, and the position of the longitudinal slits in plan view and side view. The corrugated core web can be based on plastic, fabric, fibre composite material, paper, paperboard or similar materials. The corrugated core strips 1 are each bounded by two slits 2 and 3. By means of these cuts, which do not quite cut through the material web in the thickness direction, the corrugated core web is alternately cut into from above and below. The remaining material (a cover layer and/or the peaks of the flutes of the corrugated core) are later folded at this point around the fold lines 4 and 5. FIG. 2 shows the position of the longitudinal slits and the fold lines in front view. The ratio between the width and the height of each corrugated core strip is preferably in the range from 0.5 to 2.

FIGS. 3 to 6 show the folding of the connected corrugated core strips step by step in front view. An adhesive 6 for packaging purposes, preferably based on starch or PVA, can be applied to the corrugated core cover layer strips before they are folded. The adhesive can be applied to the entire surface or only at the point where the peaks of the flutes or valleys of the flutes meet the adjacent corrugated core strips. FIGS. 7 to 10 show the same intermediate production steps in a perspective illustration.

FIG. 11 shows the process for producing the folded honeycomb from corrugated cardboard in plan view. The positions of the individual process steps are shown in FIG. 12. Firstly, at position 10, the longitudinal slits are introduced into the material web. Then, from 11 to 13, the material strips are rotated. Here, an adhesive can optionally be introduced first during the rotation (for example at 12). At 14, covering layers can then be applied to the folded honeycomb.

In the continuous process, torsional stresses result from the rotation of the connected corrugated core strips. These stresses are relatively low, because of the low torsional rigidity of the thin, narrow strips. The length of this process step can therefore be relatively short (<0.5 m), if there is no change in the web width. The ratio between the thickness of the corrugated core web and the thickness of the honeycomb core layer necessarily corresponds to the ratio between the widths of the two material webs ($b_{honeycomb}=b_{corrugation}\cdot t_{honeycomb}/t_{corrugation}$).

The corrugated core thickness ($t_{corrugation}$) should preferably be selected to be equal to the honeycomb core thickness ($t_{honeycomb}$), in order that a constant machine width results ($b_{honeycomb}=b_{corrugation}$). However, during the rotation of the material strips, a maximum width of the web is in any case reached with $b_{max}=b_{corrugated}\cdot\sqrt{(t_{corrugated}^2+t_{honeycomb}^2)}/t_{honeycomb}$. With the same material thickness $t_{corrugation}=t_{honeycomb}$, the width change would be $b_{max}=1.41\cdot b_{corrugation}$. This change in the web width can be prevented by guiding the material strips briefly out of the plane of the web.

FIG. 13 shows the guidance of the material web out of the plane of the web in side view. The connected corrugated core strips can be bent slightly during the 90° twist. However, bending the twisted corrugated core strips requires a greater length of the twisting region. It is therefore expedient to make the web slightly wavy over the width in order in this way to limit the deformations from the plane of the web. FIGS. 14 to 16 show the individual steps during a possible deformation of the connected corrugated core strips out of the plane of the web in order to avoid the change in web width.

In addition, the change in width can be reduced considerably if the corrugated core strips are rotated one after another. In this case, it is particularly advantageous to rotate first of all each third corrugated core strip first. In this way, all the corrugated core strips can be rotated in three stages without any noticeable change in width resulting. FIG. 17 shows the three-stage rotation of each third corrugated core strip and the resulting slight deformations out of the plane of the web, in individual front views. Individual corrugated core strips or a number of corrugated core strips can also be rotated one after another in a different sequence in order to limit the change in width.

Nevertheless, a reduction in the web width during the production of honeycomb core layers with a greater thickness ($t_{honeycomb}>t_{corrugation}$) and an increase in the web width during the production of smaller thicknesses ($t_{honeycomb}<t_{corrugation}$) may possibly be advantageous up to a certain extent, for reasons concerning the flexibility of the system. The ratio between the thickness of the corrugated core web ($t_{corrugation}$) and the thickness of the honeycomb core layer ($t_{honeycomb}$) is in this case preferably between 0.5 and 2. FIG. 18 shows an apparatus for introducing the longitudinal slits. This apparatus can comprise simple longitudinal cutting knives 20, which rotate on an upper 21 and a lower shaft 22 or on a large number of separate shafts. The distance between the upper and lower cutting knives in relation to one another and among each other should be as uniform as possible, in order to achieve a high cutting accuracy and therefore a very constant honeycomb core thickness. In addition, the material web should be guided as exactly as possible (for example by means of rolls) in order that an exact depth of the slits is achieved. The rapid exact cutting of corrugated cores in the production direction is already carried out in corrugated cardboard production. In addition to the preferred use of rotating knives, cutting with stationary knives is also conceivable. The connected corrugated core strips form a relatively stable web, and therefore the corrugated core web can be conveyed by using rolls or belts downstream of the longitudinal cutting knives, following the introduction of the slits.

FIG. 19 shows a variable apparatus 24 for introducing the longitudinal slits. By means of uniform adjustment of the distances between the individual cutting knives 20 in the width direction, honeycomb core layers of different thickness can be produced. In addition, the rapid replacement of the complete cutting rolls (for example using turret systems, as they are known) is also conceivable.

FIG. 20 shows an apparatus for rotating and folding together the connected corrugated core strips. The apparatus may comprise simple stationary guides 23, rotating rolls or transport belts. The geometry of these guides determines how the connected corrugated core strips are rotated during transport and folded against one another. Thereby, either sequential rotation, in which the result is very slight step-like waviness over the width, or simultaneous rotation with a larger waviness over the width is possible.

FIG. 21 shows a variable apparatus for the simultaneous rotation and folding together of the connected corrugated core strips with waviness over the width. FIG. 17 shows how the guides of the individual material strips have to guide each third corrugated core strip in three stages as they are rotated. In the case of this variant, it is advantageous that it is sufficient to lead the respective non-rotating two corrugated core strips upwardly and downwardly, in order to rotate the respective corrugated core strip located between them through 90°.

This folded honeycomb made of corrugated cardboard, the process described and the apparatus permit the production of a honeycomb material which is significantly superior to the corrugated cardboard in all material characteristics. The honeycomb core layer thickness should preferably be more than 4 mm, since the material savings as compared with corrugated cardboard with two corrugated cores lying one above another are particularly large. However, even with lower heights, the honeycomb provides considerably better material characteristics. The material can be produced from the same, even if lighter papers (kraftliner or testliner) and the conventional adhesive based on starch or PVA with manufacturing equipment which, in terms of significant components, is equivalent to the widely developed corrugated cardboard manufacturing equipment. The two additional process steps (introduction of the longitudinal slits and folding the connected corrugated cardboard strips) can be carried out by the simple apparatus described and do not reduce the production speed.

Using the above-described adjustable longitudinal cutting and guidance devices and the exchange, common in the corrugated cardboard industry, of the rolls and components, a manufacturing equipment for single-flute corrugated cardboard is able to produce folded honeycombs of different thicknesses very flexibly. The production costs are expected to be lower than those in the production of two-layer corrugated cardboards. In addition, the production speed on a honeycomb cardboard production manufacturing equipment based on a single-flute corrugated cardboard manufacturing equipment will probably be greater than the double-flute corrugated cardboard manufacturing equipment which are common nowadays.

During the production of folded honeycombs from corrugated cardboard, the gluing of the covering layers can be carried out in the same production line, directly after the finishing of the core layer, and for the further processing of the honeycomb cardboard, the cutting, punching and printing machines which are common in the corrugated cardboard processing industry can be used.

As compared with the corrugated cardboard, honeycomb cardboard has significantly better compressive strengths in the plane of the material (edge compression resistance, ECT), in particular in the production direction (machine direction). In addition, at right angles to the plane of the material (flat compression resistance, FCT), it provides significantly improved compressive characteristics and a greater absorption of shock energy. The possible savings in weight and material, the direction-independent strengths and the better surface quality, and also the small expenditure for the additional production steps, permit the expectation that the folded honeycomb cardboard made of corrugated cardboard is capable of competing with corrugated cardboard.

In addition, the folded honeycomb can be further processed in various ways to form sandwich components, without cover layers being laminated on. The honeycomb cells can additionally be filled with a foam or similar material for the purpose of improved acoustic and thermal insulation. Moreover, the honeycomb cell walls can be impregnated or coated by means of a dipping bath or by spraying. The good material characteristics and the low production costs permit the expectation that this material, in addition to packaging applications, will also find applications in other sectors, such as in inner cladding components for vehicles, in furniture, floor coverings and wall coverings, and so on.

The advantages of the folded honeycomb according to the invention are:

a) improved printability as a result of better surface quality, b) improved mechanical characteristics, for example flat compression resistance and edge compression resistance, bending strength, flexural rigidity, c) low weight with the same mechanical characteristics, d) good impact resistance and mechanical characteristics after an impact or shock, e) environmental friendliness, for example 20 to 25% less raw materials are used and the folded honeycomb finds application where hitherto non-reusable materials have been used.

What is claimed is:

1. A folded honeycomb, comprising a large number of core strips which lie beside one another and in one plane and each comprises a corrugated or trapezoidal core having flutes with a corrugated or trapezoidal cross-section, respectively and with at least one cover layer, the cover layers of the core strips being arranged parallel to one another and transversely with respect to the one plane, and the longitudinal direction of the flutes of the core extending, for each core strip, perpendicularly to the core strip, and the core strips being connected to one another, wherein for at least each second core strip, a cover layer of one core strip is formed in one piece with the cover layer of one of the adjacent core strips and is connected to the latter via a connection formed by a fold of 180° in the cover layer, and the connections between adjacent core strips are arranged alternately on one side and the other side of the folded honeycomb.

2. The folded honeycomb according to claim 1, wherein the ratio between the width and the height of each core strip lies in the range from 0.5 to 2.

3. The folded honeycomb according to claim 1, wherein the ratio between the weights per unit area of material making up the core and material making up the cover layer of each core strip lies in the range from 1 to 2.

4. The folded honeycomb according to claim 1, wherein the cover layer of the corrugated or trapezoidal core of at least each second corrugated strip is wholly or partly connected over its entire area to the cover layer of the corrugated or trapezoidal core of at least one adjacent core strip.

5. The folded honeycomb according to claim 1, wherein each core strip has two cover layers and a corrugated or trapezoidal core arranged between them, and one cover layer of each core strip is formed in one piece with a cover layer of an adjacent core strip and is connected to the latter via a fold of 180°, and the other cover layer is formed in one piece with a cover layer of another adjacent core strip and is connected to the latter via a fold of 180°.

6. The folded honeycomb according to claim 1, wherein a cover layer is arranged at least on one side of a large number of core strips lying beside one another.

7. A process for the continuous production of a folded honeycomb, comprising the following steps:

a) forming connected core strips in one plane, each strip comprising a corrugated or a trapezoidal core having flutes with a corrugated or trapezoidal cross-section, respectively and at least one cover layer, the cover layers of the core strips being arranged parallel to one another and transversely with respect to the one plane, and the longitudinal direction of the flutes of the core extending, for each core strip, perpendicularly to the core strip and parallel with respect to the one plane, the core strips being connected to one another and, for at least each second core strip, the cover layer of one core strip being connected to the cover layer of an adjacent core strip; and b) rotating the connected core strips through about 90° in relation to one another, as a result of which the cover layers of the core strips are folded through about 180° at lines connecting the core strips to thereby bring the longitudinal direction of the flutes of the core to extend, for each core strip, perpendicularly to the core strip and transversely with respect to the one plane.

8. The process according to claim 7, wherein the ratio between the width and the height of each core strip lies in the range from 0.5 to 2.

9. The process according to claim 7, wherein the ratio between the weights per unit area of material making up the core and material making up the cover layer of each core strip lies in the range from 1 to 2.

10. The process according to claim 7, wherein touching surfaces are firmly connected to one another, either with adhesive which is applied previously or in another way.

11. The process according to claim 7, wherein at least one cover sheet is laminated onto the folded honeycomb.

12. The process according to claim 7, wherein the step of forming the connected core strips includes cutting completely through a core web to form individual core strips.

13. The process according to claim 7, wherein the step of forming the connected core strips includes the longitudinal slitting of a core web to form connected core strips.

14. A system for producing a folded honeycomb, comprising:

a) a first apparatus for forming connected core strips in one plane, each strip comprising a corrugated or a trapezoidal core with flutes having a corrugated or trapezoidal cross-section, respectively and with at least one cover layer, the cover layers of the core strips being arranged parallel to one another and transversely with respect to the one plane, and the longitudinal direction of the flutes of the core extending, for each core strip, perpendicularly to the core strip and parallel with respect to the one plane, the core strips being connected to one another and, in at least each second core strip a cover layer of one core strip being connected to the cover layer of one of the adjacent core strips; and b) a second apparatus for rotating the connected core strips through about 90° with respect to one another, as a result of which the cover layers are folded through about 180° at lines connecting the core strips to thereby bring the longitudinal direction of the flutes of the core to extend, for each core strip, perpendicularly to the core strip and transversely with respect to the one plane.

15. The system according to claim 14, wherein the apparatus for forming the connected core strips includes an apparatus for cutting completely through a core web to form individual core strips.

16. The system according to claim 14, wherein the apparatus for forming the connected core strips includes an apparatus for longitudinal slitting of a core web to form connected core strips.

17. The system according to claim 14, wherein the ratio between the width and the height of each core strip lies in the range from 0.5 to 2.

18. The system according to claim 14, wherein the ratio between the weights per unit area of material making up the core and material making up the cover layer of each core strip lies in the range from 1 to 2.

19. The system according to claim 16, wherein the apparatus for the longitudinal slitting of the core web has a plurality of rotating or stationary knives.

20. The system according to claim 14, wherein the rotation apparatus has a longitudinal undulation and, as a result, leads the core strips out of the one plane for some time or leads them in such a way that individual core strips or a plurality of core strips are rotated one after another.

21. The system according to claim 14, wherein an apparatus for applying adhesive to the cover layers of the core strips is located upstream or in a region of the rotation of the core strips.

22. The system according to claim 16, wherein the apparatus for cutting and for rotation in each case has adjusting devices for the variable setting of a distance of knives and guide elements in the width direction.

23. A plurality of core strips which lie one beside the other, are connected to each other and lie in one plane and which each have a corrugated or a trapezoidal core with flutes having a corrugated or trapezoidal cross-section respectively and at least one cover layer, the cover layers of the core strips being parallel to one another and the longitudinal direction of the flutes of the core, for each core strip extending perpendicularly to the core strip and parallel to the one plane, and the core strips being connected to one another, wherein for at least each second core strip, the cover layer of one core strip is formed in one piece with the cover layer of one of the adjacent core strips and can be connected to the latter by being folded through 180° to form a folded honeycomb, so that the connections between adjacent core strips are arranged alternately on one side and the other side of the folded honeycomb to thereby bring the longitudinal direction of the flutes of the core to extend, for each core strip, perpendicularly to the core strip and transversely with respect to the one plane.

24. The plurality according to claim 23, wherein the ratio between the width and the height of each core strip lies in the range from 0.5 to 2.

* * * * *